April 26, 1927.  1,626,207
S. L. MOSHER
SEED GATHERING DEVICE
Filed Jan. 20, 1921   6 Sheets-Sheet 2

April 26, 1927.

S. L. MOSHER

SEED GATHERING DEVICE

Filed Jan. 20, 1921

April 26, 1927. 1,626,207
S. L. MOSHER
SEED GATHERING DEVICE
Filed Jan. 20, 1921    6 Sheets-Sheet 5

April 26, 1927.

S. L. MOSHER

1,626,207

SEED GATHERING DEVICE

Filed Jan. 20, 1921

Patented Apr. 26, 1927.

1,626,207

UNITED STATES PATENT OFFICE.

SHERMAN L. MOSHER, OF COFFEEVILLE, MISSISSIPPI.

SEED-GATHERING DEVICE.

Application filed January 20, 1921. Serial No. 438,639.

My invention relates broadly to that general class of harvesting machines of the mower or reaper type, in which the standing stalks of grain are cut by the operation of a driven sickle or cutter bar, aided by a rotating reel, and fall backwards upon a suitable platform or receiving board. It is designed particularly to reliably gather and deliver the seeds from the standing grain that are shed or released during the cutting operation. With certain classes of grasses and grain this loss of seed is important, particularly with that class represented by seed bearing plants sometimes classed as Japanese clover or Lespedeza. In the latter class the shedding of the seed during the middle portion of the day in the cutting operation is very great, and in addition to that the particular seed that is shed during the cutting operation is much more valuable and fertile. Indeed it is found by experience that the seeds that are not so shed but are secured by threshing the grain, lack fertility and are not as valuable for seeding purposes.

My invention is particularly adapted to this class of vegetation, and in practical experience it has been found that the saving is very great.

My invention further has for its object a machine that may be constructed at reasonable cost and that will reliably gather and preserve substantially all such seeds.

To this end my invention consists in the novel construction, arrangement and combination of parts herein shown and described, and more particularly pointed out in the claims.

In the drawings, wherein like reference characters indicate like or corresponding parts.

Figure 1:
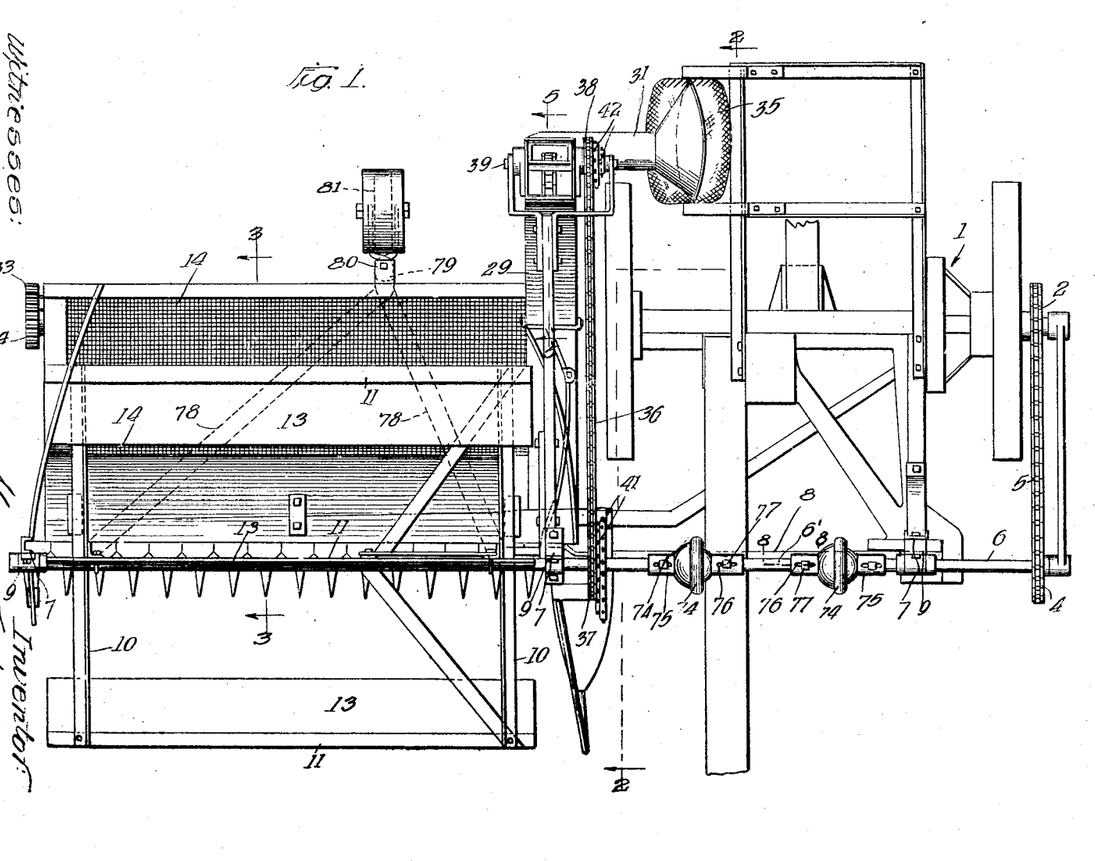
Figure 1 is a plan view of a modified form of a well known type of mowing machine equipped with my invention.

In the preferred form of my invention illustrated in the drawings, 1 indicates a mowing machine of well known type carrying upon its shaft or driven wheel the sprocket wheel 2 actuated by the advance of the machine, cooperating with a similar sprocket wheel 4 by means of the chain 5 or equivalent. The sprocket wheel 4 is mounted upon a composite shaft 6 which is supported upon suitable bearings or legs 7 carried upon the frame, the shaft preferably comprising shaft sections $6^a$, $6'$ and $6^b$. It will be noted that the sprocket 4 is fixed to the shaft section $6^a$ which may be termed a drive shaft. This shaft is constructed to provide suitable flexibility of drive to permit the usual movement of machines of this type over uneven ground without injury to the parts by means well known and which need not be here further described. The shaft is supported substantially above the pitman 8, which operates the sickle or cutter bar in the usual manner and also extends substantially above the sickle bar as shown in Figure 1. The shaft is supported in suitable operative position upon the legs 7 by adjustable bearings 9 illustrated in Figure 10.

Figures 2, 10:
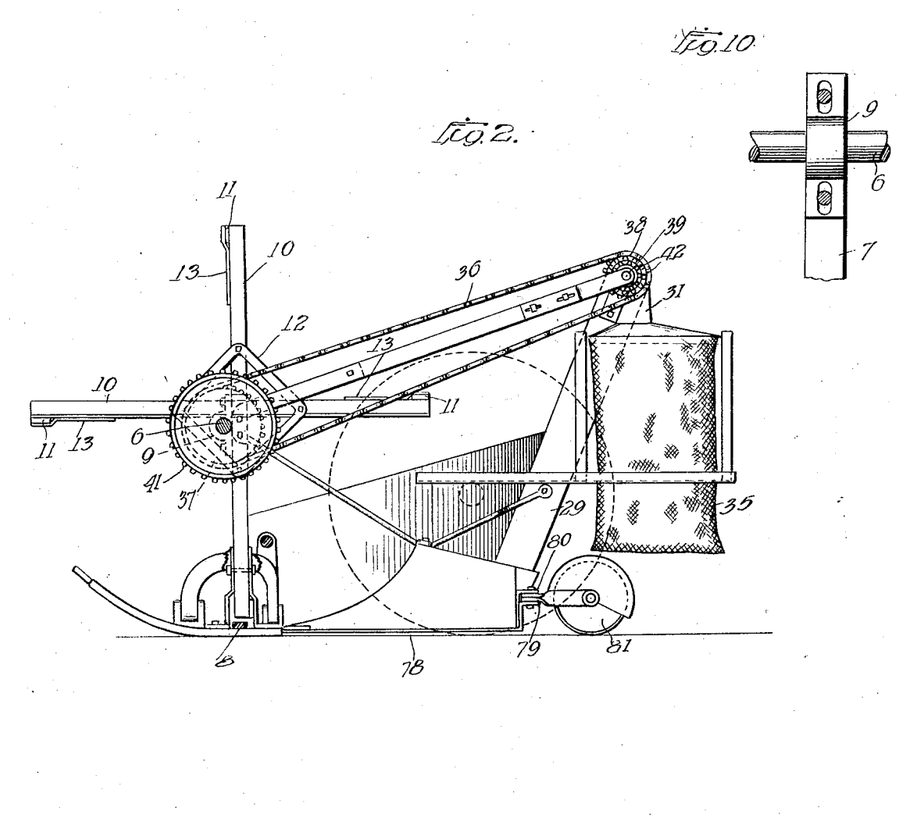
Figure 2 is an end view of my invention taken from the right with the mowing machine proper removed to more clearly illustrate the construction.
Figure 10 is a detail view of the bearings supported by the legs.

A reel, provided with extending arms 10, is mounted upon the shaft section $6^b$, as clearly shown in Figure 2, the outer and inner arms being connected by the usual connecting bars 11, (Figure 1). These arms at each end are firmly braced in any preferred manner. As illustrated this is accomplished by means of angular brace members 12, (Figure 2). The position of the reel is conventional in machines of this type and is such that the cross pieces 11 will contact with the stalks to be cut and press them backward toward the sickle or cutter bar.

In my invention in the preferred form, however, the reel also performs another and an entirely different function. That is, the reel serves as a beater to strike upon the upper or seed bearing part of the stalks with sufficient force and in a manner that will facilitate or increase the shedding of the seed and its release from the stalks. For this purpose adjustable means are preferably provided to increase the speed of the rotation of the reel, as well as adjustable means for adjusting its relative height vertically above the sickle bar and associated parts so that the cross arms of the reel will strike upon the grain at the most effective height to secure the most satisfactory results for the purpose named. In practice I prefer to substantially increase the width of the cross arms 11, either in the form or construction of the arms themselves, or by attachment of supplemental pieces 13 properly secured by any desired means in operative position. The adjusting means mentioned will be hereafter more particularly described.

Figure 3:
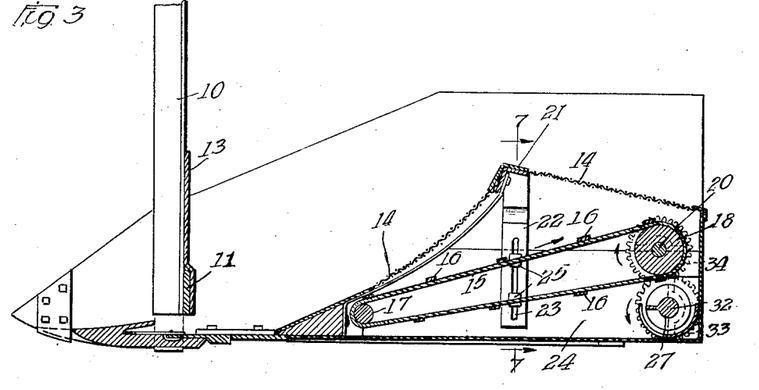
Figure 3 is a transverse section of my invention taken substantially on line 3—3 of Figures 1 and 4.

As the heads of cut grain fall backward and as the grain is carried upward by the reel, they pass over a screen 14 (see Figure 3), through which the released seed falls, aided in the separation from the associated straw by means of the beating action of the reel, which in the preferred construction is adapted to strike the straw a plurality of times as the latter is gradually moved up over the screen and is finally discharged. As shown in Figure 3, it will be noted that the screen 14 which extends across a width substantially equal to the length of the arms of the reel, is extended upward in a curve or the arc of a circle and thence backward, so that as the straw moves up on the first portion, the larger portion of the seed released will naturally be recovered through the curved screen, and as the straw is gradually pressed backward by the action of the reel over the rearward extension, whatever seed may be carried thereon and released also has a tendency to escape through the screen.

Located directly beneath the screen 14 is a conveyor belt 15 of substantially the same width as the screen, which receives the grain falling through the screen, and as it moves upward, collects and carries the same to the highest point, where the seed is preferably delivered into a suitable conveyor device of any desired type. As shown, the belt 15 is provided with cross slats 16, and is supported upon a rotating part 17 at the lower end, while at the upper end it is carried by a drum 18 driven by suitable connections. A shaft 20 supports the drum.

As illustrated a sprocket wheel 41, mounted on the shaft 6 (Figure 2) cooperates with a sprocket wheel on the elevator shaft 39 (Figures 2 and 5) and chain 36 to rotate the shaft 39. The chain or belt 39' transmits this rotation to the shaft 32, at the bottom of the elevator casing 29.

Figure 7:
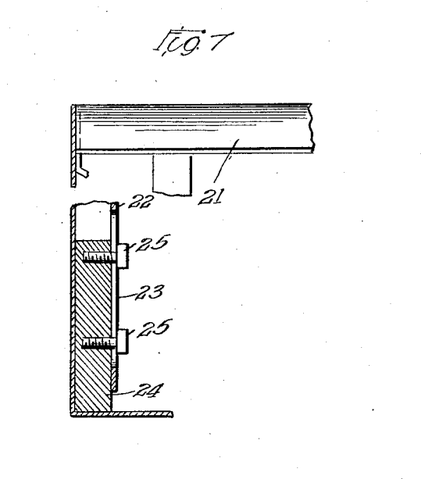
Figure 7 is a vertical section taken on line 7—7 of Figure 3.
Figure 8:
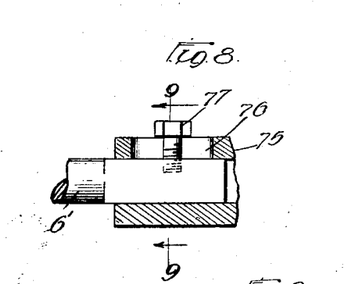
Figure 8 is a section taken on line 8—8 of Figure 1.
Figure 9:
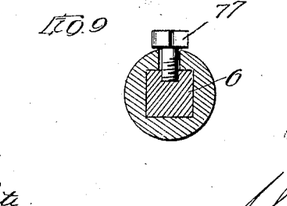
Figure 9 is a section on line 9—9 of Figure 8.

To secure complete cooperation between the reel and the screen member described, I prefer to provide not only for the vertical adjustability of the reel itself, but also for the vertical adjustment of the screen, so that it may be elevated to a point to secure the most satisfactory cooperation between the reel and the screen as the grain is gradually forced up the screen and to the rear thereof. This adjustment may be accomplished in any preferred manner. As illustrated in Figures 3 and 7, I accomplish this by supporting a suitable angle bar or other rigid piece 21 upon the frame 24 (Figure 3), to which the screen is secured, in such a manner that this supporting piece 21 may be adjusted in a vertical direction as desired. The ends of the support 21 may be supported upon bars 22 provided with slots 23. The construction just described is supported upon frame 24, clearly shown in Figure 7, with binding bolts 25, so that by loosening the bolts and moving the part 22 upward or downward, the support 21 secured thereto may be adjusted as desired.

Figure 4:
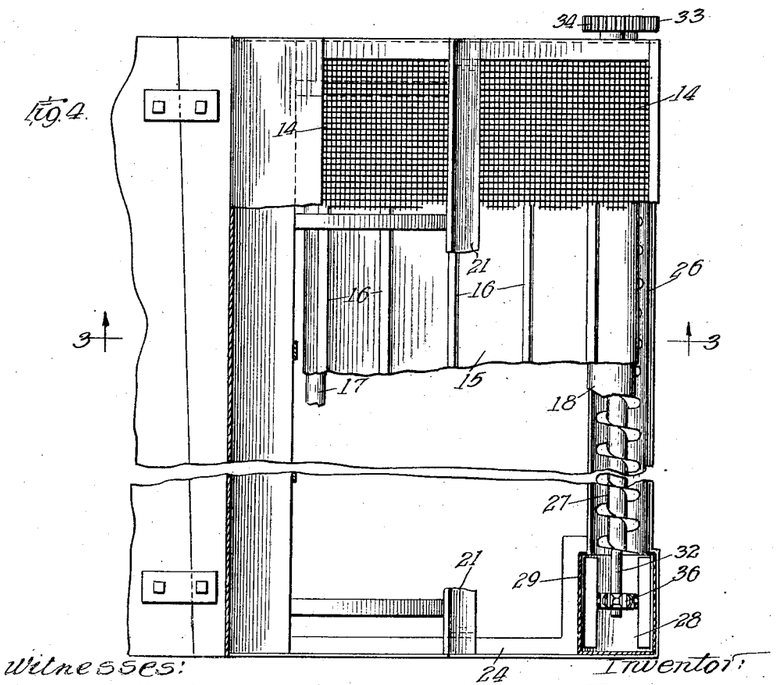
Figure 4 is an enlarged plan view of the seed gathering device with parts broken away and partly in section.
Figure 5:
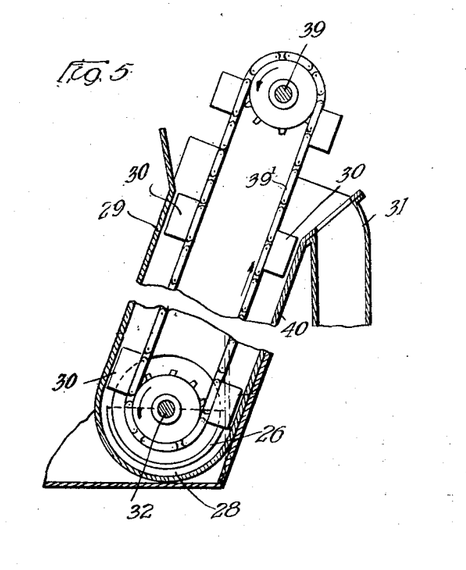
Figure 5 is a longitudinal section through an elevator adapted for use in connection with my improvement, taken on line 5—5 of Figure 1.
Figure 6:
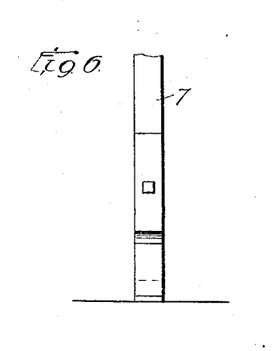
Figure 6 is a partial face view of the middle supporting bar or leg shown in side elevation in Figure 2.

Referring now more particularly to Figures 4 and 5, it will be seen that the seeds falling through the screen 14 upon the conveyor belt 15 are carried upward to the rear of the machine and thence fall vertically downward into a suitable conveyor trough 26, or equivalent receiving means. A driven worm screw 27 conveys the seeds longitudinally of the worm and delivers the same into the bottom 28 of the elevator casing 29, (Figure 5) of the conventional type provided with cross cleats 30, which serve to elevate the seed to a suitable point and discharge it into a chute 31 which delivers the grain into a bag or other suitable receptacle. Figure 1 indicates the relative position of the various parts just described in the preferred construction. Transmission of power to operate the conveyor belt, the screw conveyor and the elevator may be by any well known and preferred means. As illustrated, the two shafts shown in Figure 3, numbered 20 and 32, are arranged parallel to one another. In the form shown, the shaft 32 is rotated in the direction indicated by the arrow in Figure 3. Being operatively engaged, as described, it drives the shaft 20 and the drum 18 mounted thereon in the opposite direction, driving the belt 15 in a direction that will carry the seed thereon upward toward the rear of the machine. The shaft 32, as shown in Figure 4, also drives the driven worm conveyor 27. This serves to convey the seed or grain to the trough 26, as heretofore described. The chute 31 from the elevator casing may deliver the seed or grain into a bag 35, shown in Figures 1 and 2, supported upon a suitable part of the frame work, or to any other preferred form of receiver therefor. While any preferred means may be employed to drive the elevator mechanism, that described is preferred.

It is preferred to provide means by which the speed of the rotation of the shaft 39 may be increased or decreased, depending upon the character of material being handled. For this purpose a plurality of sprocket wheels 41 may be mounted upon the shaft 6 adjacent to the sprocket wheel 37, and cooperating sprocket wheels 42 of varying size mounted upon the shaft 39 of the elevator or equivalent means may be employed for the same purpose.

With some classes of grain or seed it may be desirable to employ means to aid in separating the seed from the chaff and such straw as may find its way through the screens 14. This may be accomplished in any preferred manner.

Figure 11:
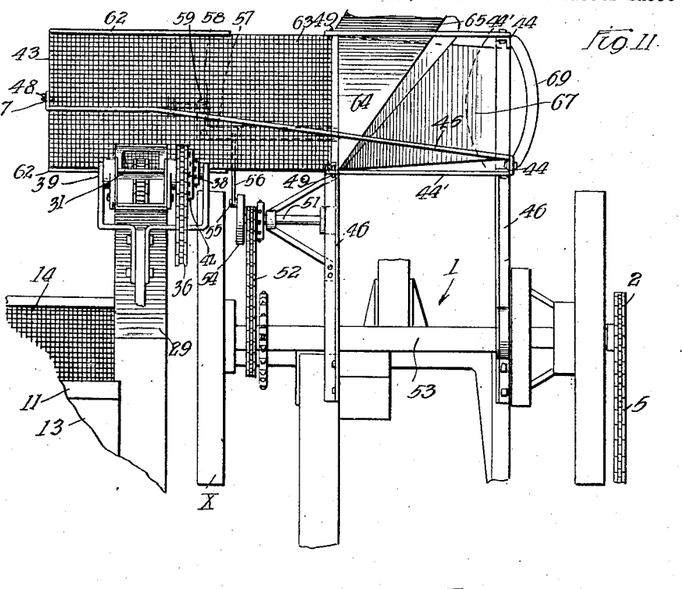
Figure 11 is a plan view showing my invention equipped with supplemental screening means for separating the seed from the chaff, straw, etc.
Figure 12:
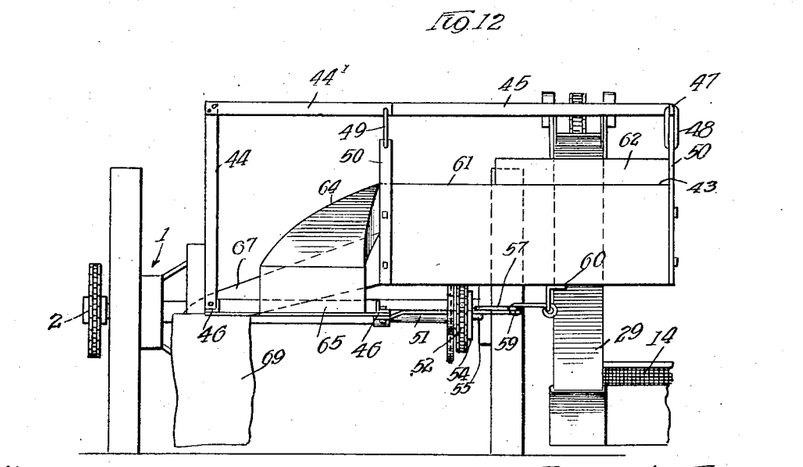
Figure 12 is a rear view of the construction shown in Figure 11.

As shown in Figures 11 and 12, the elevator is arranged to discharge the grain upon a supplemental screen 43, so mounted upon the frame of the machine that it may be agitated or shaken in the manner familiar in fanning mills and devices of that character. As shown, posts or bars 44 are supported upon the machine, and near the inner end of the screen 43 a bar 45 secured to the cross piece 46 at about the point where one of the cross pieces and one of the vertical bars 44 are engaged, has its free end extended to the outer end of the screen as at 47, and is provided with a link 48 as one point of suspension for the screen. The other two points of suspension are secured by means of links 49 at the upper ends of the support 50, (Figures 11 and 12). Thus the screen is supported at three points by the links which permit a free movement as it is agitated. Any preferred means may be employed for imparting this motion to the screen. In the form shown in Figures 11 and 12, a short shaft 51 is suitably mounted upon a part of the frame and is driven by a sprocket chain 52 extending from a sprocket wheel mounted upon the main shaft 53, or upon the driving wheel X, as preferred, of the reaper or mower. The chain, as shown, extends from the sprocket wheel on the shaft 53 to a sprocket wheel on the shaft 51. Upon the end of the shaft 51 is a disc 54 provided with a wrist pin 55 engaging a link 56, which at its other end engages a bell crank lever 57 pivotally supported at 58, with its end extended as at 59 and suitably engaging the lower or bottom face of the screen as at 60 in Figure 12. The upper face of the screen is indicated in Figure 12 as at 61. At a portion of the rear edge I prefer to place a slight elevation or guard 62. As the screen is agitated the straw and chaff carried upon the upper face thereof is gradually moved toward the open or unguarded space 63, which may be slightly inclined if desired, and is discharged from the screen at that point. If preferred, the guard 62 may be omitted to allow the straw to be discharged over the back end of the screen the full length.

The coarser portion of the grain which would tend to remain upon the upper face of the screen, may, if desired, be discharged separately from the seed proper. As shown in Figure 12, I show a chute or hopper 64 which tends to convey the coarser grain and any foreign matter from the upper end of the screen and discharge it at the bottom thereof as at 65 into any proper receptacle carried upon the frame or may discharge it upon the ground. In the form shown in Figure 12 and further illustrated in Figure 14, two screens are provided, the upper as at 43 bringing about the first separation of the seed from the grain and chaff which falls through upon a lower screen 66. As illustrated in Figure 12, the grain from this latter screen may be conveyed through a separate chute 67 and delivered into a bag 69 or other preferred receptacle. The fine stuff falling through the screen 66 may be allowed to fall directly upon the ground or may be collected by a still finer screen and discharged from that in any preferred manner.

Figure 13:
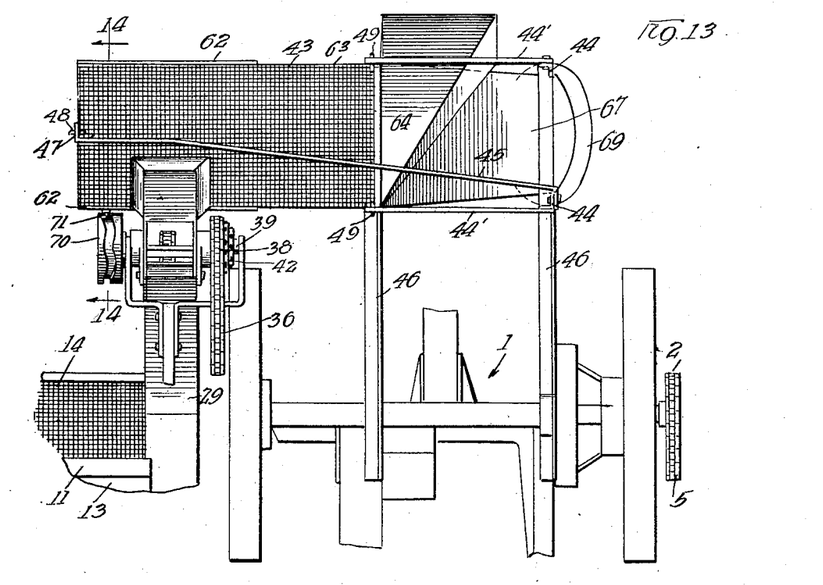
Figure 13 is a plan view of the agitating means for the secondary screen referred to, by different means from that shown in Figures 11 and 12.
Figure 14:
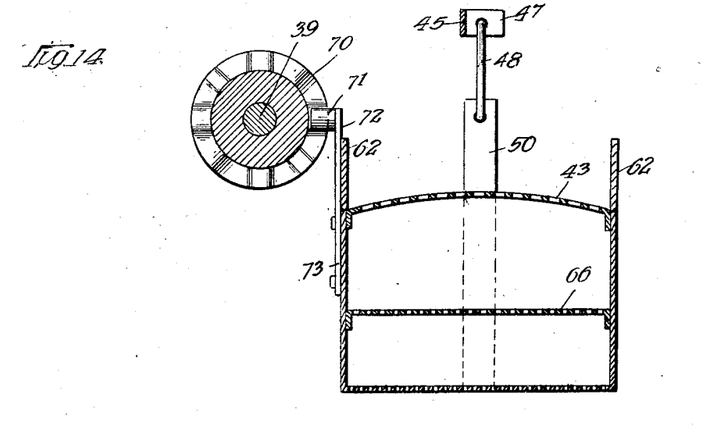
Figure 14 is a section taken substantially on line 14—14 of Figure 13.

As an alternative method of agitating the screen, a form substantially as shown in Figures 13 and 14 may be employed, in which a cam-faced disc 70 mounted upon the shaft 39 of the elevator, as shown in Figure 14, engages a roller 71 carried upon a lever arm 72 which agitates the screen. If preferred 72 which lever arm 72 may be pivotally supported between its ends on a fixed part with the free end extended and secured to the screen frame 73. The operation is substantially the same as described.

The flexible engagement of the cutting element and its associated parts with the running gear of the reaper or mower, common in devices of this kind, is preferably retained. This may be done in any preferred manner, allowing the machine to adapt itself to the irregular surface of the ground over which it is passing. As illustrated in Figure 1, the connection of the cutter or sickle bar and its associated parts with the running gear of the machine is a well known form and is located in substantially the same position to be found in machines of this type, the same, as shown, being located substantially beneath the sprocket wheels 41 or 37. Provision must also be made in the form of embodiment illustrated for a cooperating flexibility in the shaft 6, which, as shown in Figure 2, is located in a plane above the cutter bar. Any preferred construction may be employed that will provide sufficient flexibility in the shaft 6 to permit the relative movement of the cutter bar and its associated parts, with the running gear. As shown in Figure 1, I have in practice secured satisfactory results to this effect by employing universal couplings 74 provided with sleeves 75 within which is slidingly positioned the approximate ends of the composite shaft 6, which has slots 76 formed therein. A bolt 77 in each instance passes through the slots and engages the sleeve on the other side. This gives the shaft sufficient rigidity for the purpose described, and at the same time allows the shaft to bend or give as the other end of the cutter bar and its parts are raised or lowered in passing over uneven ground.

Means may be employed of a well known type to support the rear of the platform. As shown, brace members 78 are secured to the under side of the platform, as shown in Figures 1 and 2, preferably being joined together at the rear by means of coupling 79 which engages a frame 80 carrying a roller or wheel 81. The connection of the bracket with the member 80 is such as to allow the frame carrying the wheel to slightly rotate thereon in the usual manner as the machine is turned.

The usual gathering parts and boards and means to prevent the straw from becoming entangled in the machinery are employed but being well known require no further description here. Suitable well known means may also be provided to adjustably vary the horizontal or cutting plane of the cutter bar.

From the above it will be clear that the gist of my invention rests in the means of reclaiming the seed or grain that is shed during the cutting operation and is usually lost. This I accomplish by the improved means described, the novel gathering mechanism being associated with the well known type of devices of this kind. If preferred, the grain may be partially cleaned before it is delivered into the receptacle.

The operation will be clear to those familiar with the art from the disclosures made. As the machine moves forward, the grain is pressed backward by the reel and severed by the cutter bar in the usual manner, falling backward upon the screen supported above the belt 15. The reel and screen are preferably adjusted in relation to one another to secure the novel function of the arms of the reel beating the heads of the grain a plurality of times as it is carried upward over the screen and delivered over the top of the same. The released grain falls downward upon the traveling belt 15 and is delivered thence into the trough 26 or any equivalent means for the purpose, where in the preferred form it is conveyed to an elevator carried by the machine and thence into a sack or other suitable receptacle.

If desired the seed may be thence delivered upon the secondary, agitated screen, and further cleaned before delivery.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a device of the kind described, grain cutting mechanism provided with a supported stationary screen arranged to receive the cut grain and permit the seed shed therefrom to pass through the screen, in combination with means for mechanically conveying the seed from beneath the screen and delivering the same therefrom.

2. In a device of the kind described, a support, cutting mechanism for the standing grain arranged to deliver the cut stalks on the support, a stationary screen arranged above the support upon which the stalks fall, permitting the shed seeds to pass therethrough and be separated from the straw, in combination with mechanically operated means for gathering the seed passing through the screen and delivering the same beyond the same.

3. In a device of the kind described, grain cutting mechanism provided with a driven reel, and a screen arranged to receive the cut grain as beat backward by the reel, in combination with means arranged beneath the screen to mechanically remove the shed seed passing therethrough.

4. In a device of the kind described, grain cutting mechanism provided with a driven reel, a stationary screen arranged back of the reel upon whch the cut grain is beat backward by the action of the reel, and means for adjusting the relative vertical positions of the reel and screen, in combination with conveying means arranged beneath the screen adapted to remove the grain passing through the screen.

5. In a device of the kind described, grain cutting mechanism provided with a driven reel, and a stationary screen arranged to receive the cut grain as beat backward by the reel, in combination with means arranged beneath the screen to remove the shed seed passing therethrough, and mechanically delivering the same to a suitable receptacle.

6. In a device of the kind described, grain cutting mechanism provided with a reel, a screen arranged back of the reel adapted to receive the cut grain as beat backward thereon by the reel, and means for adjusting the vertical position of either the reel or the screen, in combination with conveying means arranged beneath the screen adapted to remove the seeds passing through the screen and deliver the same to a suitable receptacle.

7. In a device of the kind described, grain cutting mechanism comprising a driven cutter bar and a reel cooperating therewith to press the grain backward toward the cutter bar, a screen arranged back of the reel adapted to receive the cut grain as it falls, and means for adjusting the relative positions of the reel and screen, in combination with a driven conveyor belt to receive the grain falling therethrough and convey the same to a suitable receiving member, and means for conveying the grain therefrom to a suitable receiver.

8. In a device of the kind described, grain cutting mechanism including a driven cutter bar and a cooperating reel therefor, a primary screen arranged back of the reel upon which the cut grain is adapted to fall, an extending screen arranged back of the primary screen upon which the cut straw is forced as the reel strikes upon the cut grain on the screen, and means for adjusting the relative position of the parts, in combination with a conveyor belt, and means for receiving the grain therefrom.

9. In a device of the kind described, grain cutting mechanism provided with a stationary screen arranged to receive the cut grain and permit the seed shed therefrom to pass through the screen, in combination with a belt conveyor arranged beneath the screen adapted to receive the grain passing therethrough, and mechanism for driving said conveyor.

10. In a device of the kind described, grain cutting mechanism provided with a stationary screen arranged to receive the cut grain and permit the seed shed therefrom to pass through the screen, and means for conveying the seed from beneath the screen and delivering the same, in combination with a transverse conveyor arranged to receive the seed delivered and means for driving the transverse conveyor.

11. In a device of the kind described, grain cutting mechanism provided with a screen arranged to receive the cut grain and to permit the seed shed therefrom to pass through the screen, in combination with means for conveying the seed from beneath the screen, a transverse conveyor arranged to receive seed thus delivered and conveying the same to an elevator, and elevator mechanism for receiving the grain and lifting and delivering the same therefrom.

12. In a device of the kind described and in combination, grain cutting mechanism provided with a screen arranged to receive the cut grain and permit the seed shed therefrom to pass through the screen, conveying mechanism for receiving and transferring the same from beneath the screen, supplemental screening means, means for delivering the seed thereto, and mechanism for actuating the supplemental screening mechanism.

13. In a device of the kind described and in combination, grain cutting mechanism provided with screening means arranged to receive the cut grain and permit the seed shed therefrom to pass through the screen, and means for conveying the seed from beneath the screen, conveying mechanism arranged to receive the seed thus delivered and deliver the same to a supplemental screen, a supplemental screen arranged to receive said grain, means for actuating the supplemental screen, a third screen arranged below the supplemental screen, and means for conveying the seed from the supplemental screen and the third screen independently of one another.

14. In a device of the kind described, grain cutting mechanism provided with a stationary screen arranged to receive the cut grain and permit the seed shed therefrom to pass through the screen, in combination with means for receiving the seed passing through the screen and mechanically conveying the same therefrom, and means for regulating the movement of the conveying mechanism.

15. In a device of the kind described, grain cutting mechanism provided with a screen arranged to receive the cut grain and permit the seed shed therefrom to pass through the screen, in combination with means for conveying the seed from beneath the screen and delivering the same therefrom, means for regulating the speed of the conveying means, a supplemental conveyor arranged to receive the grain, a supplemental screen arranged to receive the grain from the supplemental conveyor, and means for adjustably operating the supplemental screen.

16. The combination in a device of the kind described of a grain cutting mechanism provided with a reel, a screen arranged to receive the cut grain thereon, and a conveyor for removing the loose seeds passing through the screen, with a vertically adjustable flexible driving shaft, means transmitting the rotating of the driving shaft to rotate the reel, and means permitting the vertical adjustment of the driving shaft and the cooperating parts.

In testimony whereof, I have hereunto signed my name.

SHERMAN L. MOSHER.